United States Patent
Ichihara

(10) Patent No.: US 7,158,171 B1
(45) Date of Patent: Jan. 2, 2007

(54) DIGITAL CAMERA IMAGE DATA PROCESSING STORAGE AND PRINTING SYSTEM

(75) Inventor: Shintaro Ichihara, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/534,206

(22) Filed: Mar. 24, 2000

(30) Foreign Application Priority Data

Mar. 25, 1999 (JP) ................................. 11-081336
Mar. 8, 2000 (JP) ............................. 2000-063453

(51) Int. Cl.
   *H04N 5/225* (2006.01)
(52) U.S. Cl. ............................... 348/207.2; 348/207.1; 348/231.99
(58) Field of Classification Search ........... 348/207.99, 348/207.1, 207.11, 207.2, 211.99, 211.2, 348/211.3, 211.4, 231.99, 231.7, 231.8, 231.9, 348/220, 211.1; 375/240, 15, 17; 710/62
See application file for complete search history.

(56) References Cited

U.S. PATENT DOCUMENTS

| | | | |
|---|---|---|---|
| 5,754,227 A * | 5/1998 | Fukuoka ................... | 348/231.6 |
| 5,806,005 A | 9/1998 | Hull et al. | |
| 5,969,750 A * | 10/1999 | Hsieh et al. ................ | 348/14.1 |
| 6,084,911 A * | 7/2000 | Ishikawa ..................... | 375/240 |
| 6,111,605 A * | 8/2000 | Suzuki ..................... | 348/220.1 |
| 6,167,469 A * | 12/2000 | Safai et al. .................... | 710/62 |
| 6,573,927 B1* | 6/2003 | Parulski et al. ............... | 348/32 |
| 2003/0179297 A1* | 9/2003 | Parulski et al. .......... | 348/207.2 |

FOREIGN PATENT DOCUMENTS

JP          9-307794          11/1997

\* cited by examiner

*Primary Examiner*—Tuan Ho
(74) *Attorney, Agent, or Firm*—Sughrue Mion, PLLC

(57) ABSTRACT

An image data processing system includes a digital camera having a camera section for converting a light from a substance to be recorded into image data, and a first memory section for storing said image data therein, first processing device, for storing the image data, provided outside said digital camera and having a second memory section for storing said image data therein; second processing device for processing said image data in accordance with instructions from said first processing device; communication apparatus having communication sections which transmit and receive data, said communication sections being provided for said digital camera, said first processing device and said second processing device, and communication circuits for connecting said communication sections to each other; and device for giving instructions on processing to be executed by said first processing device from said digital camera.

19 Claims, 4 Drawing Sheets

DIGITAL CAMERA IMAGE DATA PROCESSING STORAGE AND PRINTING SYSTEM

BACKGROUND OF INVENTION

1. Field of Invention

The present invention relates to a system for processing image data recorded by a digital camera.

2. Related Art

Conventionally, a digital camera is known, in which a light is converted into an electric signal by an optical sensor of a CCD, the electrical signal is converted into digital data, and the digital data is stored in memory medium such as a flash memory. In this specification, a digital camera includes a digital still camera capable of recording a still picture, and a digital video camera capable of recording a moving picture, as long as there is no particular indication. In the digital camera, it is possible for an individual not only to preserve the image data by use of a personal computer or the like and process variously the image data easily but also to print a photograph without developing a film by outputting the image data to a printer. Therefore, a cost conventionally necessary to buy a film is not required, which can reduce a running cost. Further, by improvement of print quality of the printer, it is also possible to print a photograph of such a high quality that it cannot substantially be distinguished from a silver-halide photograph.

However, capacity of the memory medium of the digital camera is limited and there is a limit to the number of photographs capable of being taken. Therefore, the digital camera has been inconvenient for longtime use, for example, use in travel. Though a digital camera capable of using attachable and detachable memory medium such as a memory card has been known, the memory card of the digital camera is more expensive than a film of a silver-halide camera. Therefore, in case that the large number of the memory cards are used, a purchase cost increases.

Further, in order to perform image processing such as color correction, printing and the like, instruments such as a personal computer, a printer and the like are required. Therefore, it has been difficult to perform the image processing at the destination in travel.

SUMMARY OF INVENTION

The invention has been made in order to solve the above problems, and its object is to provide an image data processing system in which image data is stored in processing means provide outside a digital camera and various processing can be executed.

According to the first aspect of the invention, an image data processing system comprises a digital camera having a camera section for converting a light from a substance to be recorded into an image data, and a first memory section for storing the image data therein; a first processing means which is provided outside the digital camera and has a second memory section for storing the image data therein; a second processing means for processing the image data in accordance with instructions from the first processing means; communication means having communication sections which transmit and receive data and are provided for the digital camera, the first processing means and the second processing means, and communication circuits for connecting the communication sections to each other; and instruction means for giving instructions on processing to be executed by the first processing means from the digital camera. Hereby, the image data recorded by the digital camera is stored in the first processing means and then variously processed by the second processing means.

According to the second aspect of the invention, in the image data processing system, the second processing means includes a print section for printing the image. Therefore, the image data recorded by the digital camera can be printed by an apparatus provided in a distant location.

According to the third aspect of the invention, in the image data processing system, the second processing means includes a third memory section for storing the image data. Therefore, data of the image recorded by the digital camera can be stored through the first processing means in the memory section of the second processing means.

According to the fourth aspect of the invention, in the image data processing system, a plurality of the second processing means are provided and the digital camera includes means for selecting the second processing means for executing the processing. Therefore, processing can be selected from plural kinds of image processing to be executed without changing a connecting destination of the digital camera According to the fifth aspect of the invention, a digital camera comprises instruction means for instructing processing means disposed outside the digital camera on processing to be executed. Namely, the digital camera can give instructions on the processing to be executed to the processing means. Accordingly, the processing means executes the complicated processing, whereby the processing by the digital camera can be reduced and a load on the digital camera can be reduced.

According to the sixth aspect of the invention, in processing means, upon reception of the instructions from the digital camera, the image data can be output to external processing means disposed outside in accordance with the instructions from the digital camera. The processing to be executed by the digital camera is performed by the processing means, and the processing content is output to the external processing means. Accordingly, a load on the digital camera can be reduced and the processing can be quickly performed.

DETAILED DESCRIPTION OF PREFERRED EMBODIMENTS

A plurality of embodiments of invention will be described below in detail with reference to drawings.

First Embodiment

Figure 1:
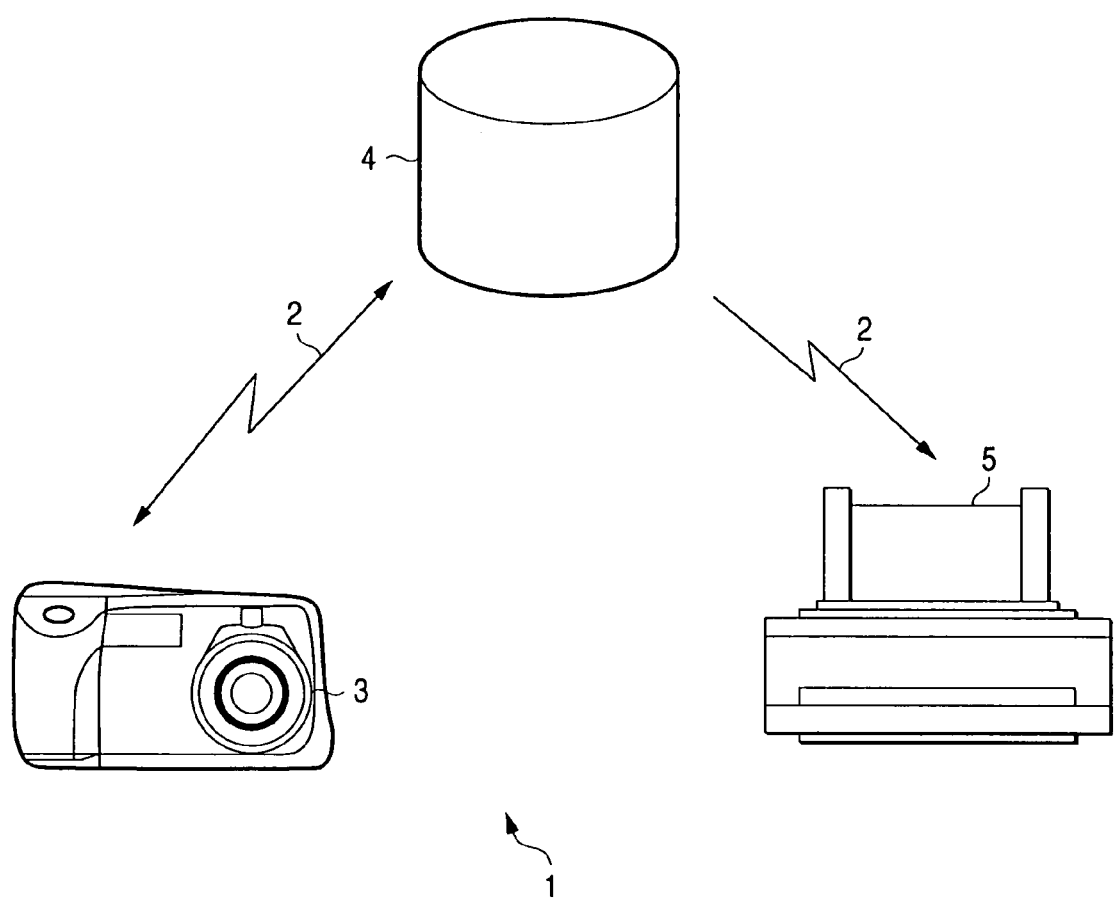
FIG. 1 is a typical view showing schematically an image data processing system according to a first embodiment of the invention.

FIG. 1 is a typical view showing an image data processing system 1 according to a first embodiment of the invention. The image data processing system 1 comprises a digital still camera 3 which records a substance to be recorded and converts it into image data; a server computer 4 serving as a first processing means having a large capacity of a memory section for storing the image data obtained by the digital still camera 3 therein; and a printer 5 serving as a second processing means for performing image processing by instructions from the server computer 4.

Figure 2:
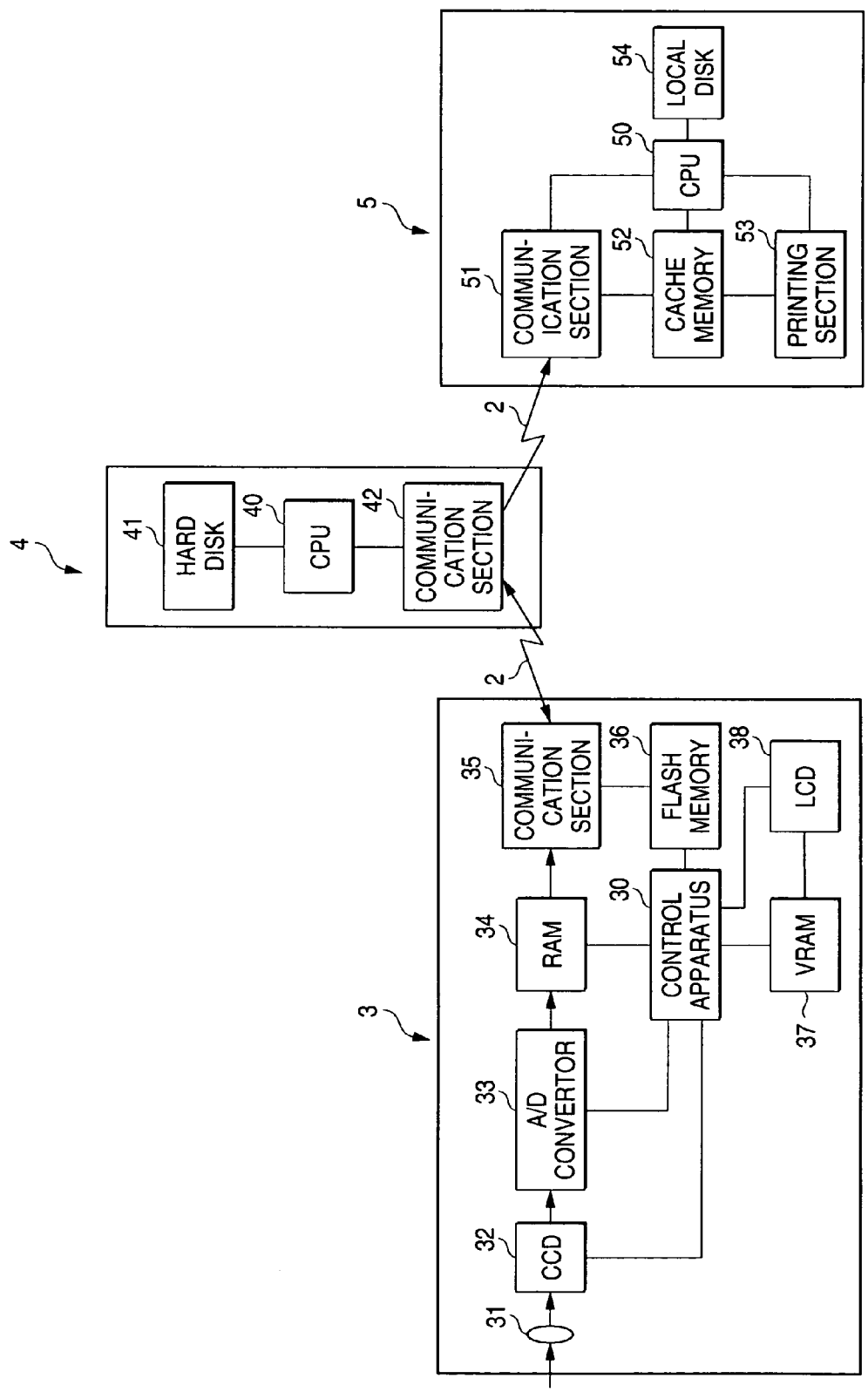
FIG. 2 is a block diagram showing the image data processing system according to the first embodiment of the invention.

As shown in FIG. 2, the digital still camera 3 comprises a camera section composed of a controller 30, a condensing lens 31, a CCD (Charge Coupled Device) 32 and an A/D converter 33; a LCD (Liquid Crystal Display) 38 serving as a display section for displaying images; a RAM (Random Access Memory) 34 serving as a first memory section for temporarily storing the image data therein; a flash memory 36 for storing the image data therein; a VRAM 37 in which data for the image to be displayed on the LCD is stored; a communication section 35 for connecting with a communication passage 2 for connecting the digital still camera 3 and the server computer 4 to each other. The communication section may be provided outside and connected to an interface of the digital still camera 3.

Figure 3:
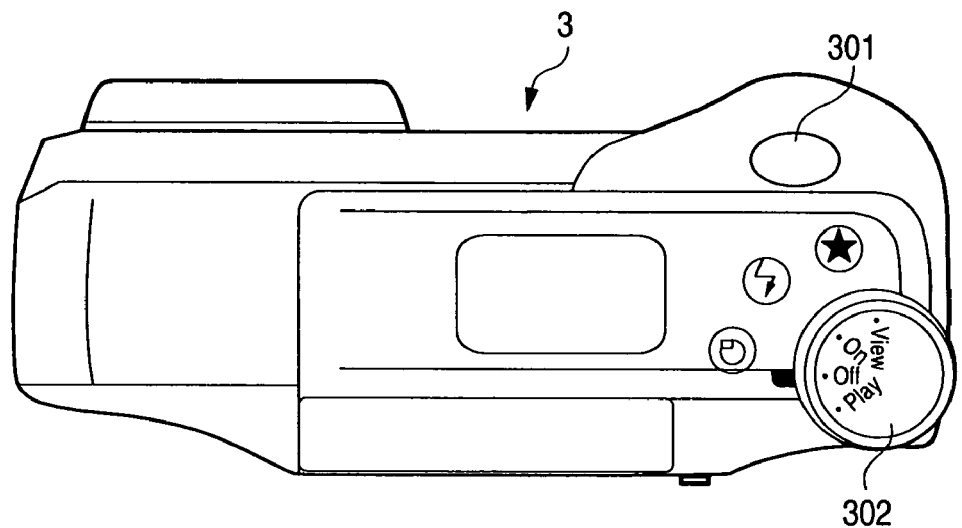
FIG. 3 is a plan view showing a digital still camera used in the image data processing system according to the first embodiment of the invention.
Figure 4:
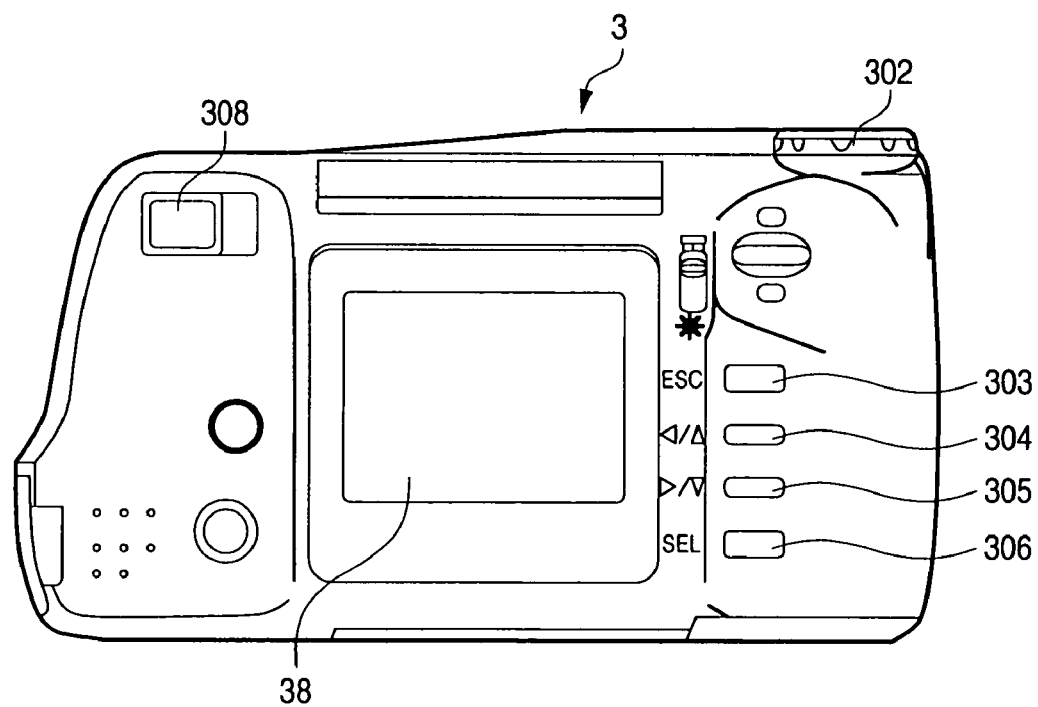
FIG. 4 is a rear elevation showing the digital still camera used in the image data processing system according to the first embodiment of the invention.

FIGS. 3 and 4 are a plan view and a rear elevation which show the digital still camera 3. In the digital still camera 3, a picture is taken by pressing a shutter button 301 down. The controller 30 can distinguish "half press down" in which the shutter button 301 is pressed down to the middle of a movable range of the button from "complete press down" in which the shutter button 301 is pressed down to the limit or to the vicinity of the limit of the movable range thereof. A user selects any one from four modes of "View", "On", "Off", and "Play" by a mode switching dial 302 for switching modes of the LCD 38. In the "View" mode, the LCD 38 is used as a viewfinder and a picture is taken. In the "On" mode, display on the LCD 38 is not performed in order to save the consumption electric power of the digital camera 3, and a picture is taken through an optical finder 301. In the "Play" mode, images are displayed according to the image data that have already been photographed and recorded. When the mode switching dial 302 is in an "Off" position, a power source of the digital still camera 3 is switched off.

On the rear portion of the digital still camera 3, there are provided an ESC button 303 serving as an instruction means for inputting various operations of the digital still camera 3, a first arrow button 304, a second arrow button 305 and a select button 306.

As shown in FIG. 2, the server computer 4 comprises a CPU 40 serving as a controller capable of executing various control operations; a hard disc 41 serving as a second memory section; and a communication section 42 for connecting with the communication passage 2 for connecting the digital still camera 3 and the printer 5 to each other.

The hard disk 41 stores therein a large amount of the image data transmitted from the digital still camera 3 to the server computer 4, and has a large capacity and a high-speed access function in order to communicate data between the server computer 4 and the digital still camera 3 at a high speed. In this embodiment, a part of the memory region of the hard disc 41 of the server computer 4 is provided as a user region of the digital still camera 3, and the data can be transmitted and received between the server computer 4 and the digital still camera 3 by a procedure of an FTP (File Transfer Protocol).

The printer 5 is connected to the server computer 4 through the communication passage 2. In accordance with instructions given from the user by operating the digital still camera 3, the printer can print images according to the image data stored in the hard disc 41. The printer 5 comprises a communication section 51 for connecting with the communication passage 2 that connects the printer 5 and the server computer 4 to each other; a cache memory 52 for temporarily storing the image data received from the server computer 4; a printing section 53 provided with a print head or a print unit for performing a print operation; a local disk 54 serving as a third memory section which keeps the image data of which printing has been completed; and a CPU 50 for controlling the function of the printer 5. An ink jet printer, a thermal transfer printer, a laser printer and the like can be used as the printer 5.

An Internet which transmits and receives data, for example, on an optical fiber cable, an Ethernet, a telephone circuit, and a wireless communication circuit, by use of protocol such as TCP/IP (Transmission Control Protocol/Internet Protocol) can be used as the communication passage 2. The communication means is composed of the communication section 35 provided for the digital still camera 3, the communication section 42 provided for the server computer 4, the communication section 51 provided for the printer 51, and the communication passage 2 for connecting the communication sections to each other.

Next, an operation of the digital still camera 3 in the embodiment will be described.

When the mode switching dial 302 is in the "View" position, the lights condensed on the CCD 32 by the condensing lens 31 every one-several seconds to one-several tenth seconds are converted into electric signals, then, converted into digital image data, and transferred to the VRAM 37, so that the recorded subject is displayed on the LCD 38 as a moving picture.

When the substance is recorded, the controller 30 controls an iris of the condensing lens 31 and the shutter speed, that is, a storage time of the CCD 32 is controlled in accordance with the data output from the CCD 32, whereby exposure is changed. As the shutter of the digital camera 3, a shutter for physically intercepting light, an electronic shutter of the CCD 32, or both of them can be used.

When the user half presses down the shutter button 301 of the digital still camera 3, the suitable exposure and focus are set on the image recognized by the CCD 32, so that the exposure and focus are fixed while the shutter button 301 is pressed down half.

When the user completely presses down the shutter button 301, a picture starts to be taken and an image data is made up. Once all electric charges stored in the CCD 32 are discharged, thereafter the lights condensed by the condensing lens 31 are input to the CCD 32. In the CCD 32, the lights are converted into the electric charges corresponding to the quantity of the lights. The electric signal output from the CCD 32 is converted into a digital signal by the A/D converter 33. The digital data output from the A/D converter 33 specifies address of the RAM 34 not through the controller 30 but directly by DMA (Direct Memory Access) because of speed-up, and the digital signal is transferred there.

Since one picture element in the data transferred from the CCD 32 has only information corresponding to one color, color interpolation is performed in accordance with color information of the surrounding picture elements in the data recorded in the RAM 34. For example, image data having color information on each picture element of 1280×960 pixels are made up.

Next, in order to increase the number of recording sheets in recording medium, the data is compressed by irreversible compression system that meets standard requirements of JPEG (Joint Photographic Experts Group), so that a compression data of a small capacity is produced. The JPEG is a compression method of a color image, which is generally used and can adjust the kept image quality by changing the compression rate. The JPEG compression is performed by the controller 30 in a manner of software and also can use a private circuit because of speed-up. The compression data subjected to the JPEG compression is recorded in the flash memory 36. Further, the compression data is recorded not in the flash memory 36 but in the hard disc 41 of the server computer 4 through the communication passage 2 instead. The user can select which of the flash memory 36 and the hard disc 41 the compressed image data is recorded in. Further, the image data that has been recorded in the flash memory 36 once can be further recorded in the hard disc 41.

There is a case in which it takes several seconds to tens seconds till recording of the image date is completed since it is started. Picture images according to the image data continue to be displayed on the LCD 38 for its time.

When the mode switching dial 302 is in "On" position, the electric current does not flow through the LCD 38, and the LCD 38 is always in a state of non-display. Usually, the electric current does not flow through the CCD 32, and the operation of the CCD 32 is started when the user presses down the shutter button 301 half. The other operations are similar to those in the "View" mode. The user determines the recording range by use of the optical finder 308.

When the mode switching dial 302 is set to "Play" position, the images according to the image data in the flash memory 36 or the hard disc 41 are displayed on the LCD 38. When the first arrow button 304 is pressed down, the previous image is displayed. When the second arrow button 305 is pressed down the next image is displayed. Even in case that the image data is recorded in the hard disc 41, the small capacity of data of a thumbnail image in which the number of the picture elements is small are stored in the flash memory 36, whereby the thumbnail image can be displayed at a high speed.

When the select button 306 is pressed down, a menu display mode appears, so that various kinds of setting such as date, image quality and the like can be performed. An item to be set is selected by the first arrow button 304 and the second arrow button 305, and repressing of the select button 306 enables the setting to be changed. Here, the condition of the numeral value can be changed by the first arrow button 304 and the second arrow button 305. Further, by pressing down the ESC button 303, the camera can return to the previous screen.

By selecting a "Print" menu in the menu display mode, the image can be printed. A process for printing the image according to the image data recorded in the hard disc 41 will be described below.

The user searches an image he wants to print while he watches the image displayed on the LCD 38 of the digital still camera 3. Even in case that a large amount of image data are recorded in the hard disc 41, by using the thumbnail for search, the user can quickly search and select the image of desire. When the user watches the thumbnail, selects the image of desire, and gives an instruction of print, the sever computer 4 receives the instruction from the digital still camera 3, searches image data of the image selected by the user from the hard disc 41, and transmits the image data from the hard disc 41 to the printer 5.

The printer 5 receives the image data and once stores it in the cache memory 52 provided for the printer 5. The image data stored in the cache memory 52 is formed into print data by the CPU 50 provided for the printer 5 every time printing is executed, and the print section 53 executes printing in accordance with the print data. Since the image data is stored in the cache memory 52 as described above, in case that the image corresponding to the same image data is continuously printed on a plurality of sheets, printing can be quickly executed. This is due to the following reason. For example, even in case that the image data stored in the hard disc 41 of the server computer 4 is formed into data of about 100 k bites by being compressed by the JPEG system, when the compressed data is converted into print data for printing in the printer 5, the print data becomes large data of several M bites to several tens M bites, which depends on a size of the image to be printed. Therefore, by once transmitting the image data from the hard disc 41 to the cache memory 52 of the printer 5 for the purpose of memory and converting the image data into the print data in the printer every time printing is performed, quick printing can be made more possible than by making up the print data by the server computer 4 and transmitting the print data to the printer 5 thereby to perform the printing operation.

When the printing is completed, the image data stored in the cache memory 52 is kept in a local disc 54 provided for the printer 5. Accordingly, in case that an image that is the same as the image printed once is printed, that is, in case that an additional print is made, since the image data is kept in the local disc 54, it does not need to be retransmitted from the hard disc 41 of the server computer 4.

In case of a personal user, he can employ a server computer 4 of business concerned, install the printer 5 in his house, and instruct the server computer 4 to control the printer 5 through the communication passage 25 at the location distant from his house by use of the digital still camera, so that the image data stored in the hard disc 41 can be printed.

Further, the printer 5 can be installed at a photo shop, a mini laboratory, a convenient store or the like so that many users can use the printer.

Second Embodiment

Figure 5:
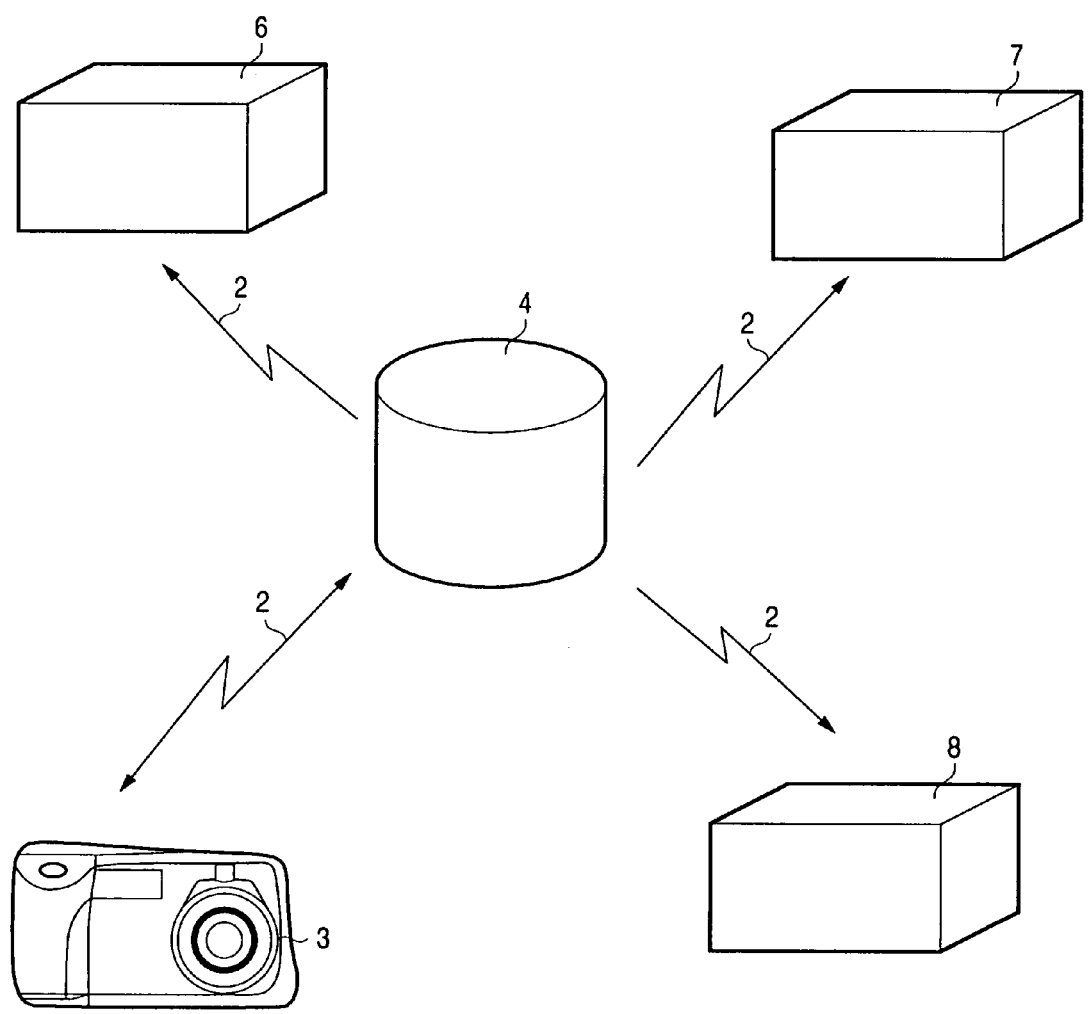
FIG. 5 is a typical view showing schematically an image data processing system according to a second embodiment of the invention.

FIG. 5 is a typical view showing an image data processing system according to a second embodiment of the invention. In this embodiment, a plurality of second processing means 6, 7 and 8 are provided. In the first embodiment, the printer which prints the image is employed as the second processing means. However, it is also possible to employ other image processing devices such as a memory device for storing the image data therein and to receive printing of the image and other services by transmitting the data to the business concerned.

A connecting destination of a server computer 4 serving as a first processing means to the second processing means 6, 7, 8 and execution contents are previously set and stored in a memory device of the server computer 4. And, the user operates a digital still camera 3 and selects the processing to be executed by the server computer 4. Therefore, a connecting destination of a communication section of the digital still camera 3 is only the server computer 4 and does not need to be changed, so that setting and operation are simplified. Further, a procedure of the processing executed by the second processing means is stored not in the digital still camera 3 but in the server computer 4. Therefore, a load on a controller 30 of the digital still camera 3 is reduced.

As described above, in the plural embodiments of the invention, a mode in which the hard disc is utilized as a memory section of the server computer has been described. However, the memory section is not limited to the hard disc as long as it is a high-speed memory section which has a large capacity and can read and write data at any time, such as a magnetic disc, an optical disc and the like.

Further, the image data processing system in which the still picture recorded by the digital still camera is transmitted and received has been described, however not only the still picture but also the moving picture may be transmitted and received.

What is claimed is:

1. An image data processing system comprising:
    a digital camera having a camera section for converting a light from a substance to be recorded into image data, and a first memory section for storing said image data therein;
    first processing means, for processing the image data, provided outside said digital camera and having a second memory section for storing said image data therein;
    second processing means for processing said image data in accordance with instructions from said first processing means;
    communication apparatus having communication sections which transmit and receive data, said communication sections being provided for said digital camera, said first processing means and said second processing means, and communication circuits for connecting said communication sections to each other; and
    instruction means for giving instructions on processing to be executed by said first processing means from said digital camera,
    wherein the digital camera comprises a selection means selecting between the first memory section and the second memory section for selectively storing the image data,
    wherein, when the second memory section is selected as a storage for the image data by the selection means, the image data is transmitted to the second memory section without being stored into the first memory section, and
    wherein said communication section for said digital camera transmits and receives image data based on said instructions from said instructions means.

2. The image data processing system according to claim 1, wherein, said second processing means includes a print section for printing the image.

3. The image data processing system according to claim 2, wherein said second processing means includes a third memory section for storing the image data.

4. The image data processing system according to claim 3, wherein the system includes a plurality of said second processing means, and said digital camera includes selecting means for selecting said second processing means.

5. The image data processing system of claim 1, wherein the digital camera comprises the instruction means.

6. The image data processing system of claim 1, wherein the first processing means communicates directly with the digital camera.

7. The image data processing system of claim 1, wherein the digital camera comprises a display capable of displaying the image data stored in the second memory section.

8. A digital camera comprising:
    a camera section for converting a light from a substance to be recorded into image data;
    a first memory section for storing said image data therein;
    instruction means for instructing a processing means on processing to be executed disposed outside the digital camera, and the processing means having a second memory section for storing said image data therein; and
    a connecting section for connecting with a communication circuit capable of transmitting the instructions from said instruction means and said image data, and
    a selection means selecting between the first memory section and the second memory section for selectively storing the image data,
    wherein, when the second memory section is selected as a storage for the image data by the selection means, the image data is transmitted to the second memory section without being stored into the first memory section, and
    wherein the connecting section is capable of receiving image data based on said instructions from said instructions means.

9. The digital camera of claim 8, wherein the instruction means communicates directly with the processing means.

10. The digital camera of claim 8 comprises, a display capable of displaying the image data stored in the second memory section.

11. An image data processing system comprising:
    a digital camera that has a first memory that stores image data and has a communications circuit;
    a first processing circuit that processes said image data, is provided outside said digital camera, and has a second memory that stores said image data; and
    a second processing circuit that processes said image data in accordance with instructions from said first processing circuit,
    wherein said digital camera comprises a switch to select between said first memory and said second memory to selectively store said image data,
    wherein, when the second memory is selected as a storage for the image data by the switch, the image data is transmitted to the second memory without being stored into the first memory, and
    wherein said communications circuit receives said image data from said first processing circuit.

12. The image data processing system according to claim 11, wherein said second processing circuit includes a print circuit that prints said image data.

13. The image data processing system according to claim 12, wherein said second processing device includes a third memory that stores said image data.

14. The image data processing system according to claim 13, wherein the system includes a plurality of said second processing circuits, and said digital camera includes a selecting circuit that selects one of said second processing circuits.

15. The image data processing system of claim 11, wherein said first processing circuit communicates directly with said digital camera.

16. The image data processing system of claim 11, wherein said digital camera comprises a display circuit that displays image data stored in said second memory.

17. A digital camera comprising:
    a camera circuit;
    a first memory that stores image data;
    a communications circuit that communicates with a processing circuit that is disposed outside said digital camera, said processing circuit having a second memory that stores said image data; and a switch to select between said first memory and said second memory to selectively store said image data, wherein, when the second memory is selected as a storage for the image data by the switch, the image data is transmitted to the second memory without being stored into the first memory, and wherein the communications circuit receives said image data from said processing circuit.

18. The digital camera of claim 17, wherein said communications circuit communicates directly with said processing circuit.

19. The digital camera of claim 17, comprising:

a display circuit that displays image data stored in said second memory.

* * * * *